United States Patent Office 3,210,146
Patented Oct. 5, 1965

3,210,146
COLOR STABILIZED POLYURETHANE FOAMS AND PRODUCTION THEREOF
James J. Eberl, Moylan, Rocco P. Triolo, Broomall, and Cornelius G. Fitzgerald, Wallingford, Pa., assignors to Scott Paper Company, Philadelphia, Pa., a corporation of Pennsylvania
No Drawing. Filed Jan. 24, 1962, Ser. No. 168,502.
19 Claims. (Cl. 8—4)

The present invention relates to cellular polyurethane plastics and more particularly to a process for the production of stabilized color values in autogenously colored polyurethane foams.

The production of flexible polyurethane foams, while a comparatively recent development, has been the subject of considerable investigation. The basic reaction is understood to involve a polymeric material containing active hydrogen atoms, as for example hydroxyl terminated polyesters, polyester amides and polyalkalene ether glycols with an organic polyisocyanate whereby there is a chain extension of the polymeric material through reaction of the isocyanate groups with active hydrogen atoms. Additionally water is included in the reaction mixture for combination with a portion of the polyisocyanate to form an unstable carbamate which breaks down liberating carbon dioxide to foam or cellulate the reaction mixture while leaving a primary aromatic amine. Ordinarily the amine residue will react with more isocyanate in cross-linking the polymeric materials. However, because of the many reactions competing for isocyanate groups, there will normally be unreacted amine groups remaining in the polyurethane molecule when the supply of isocyanate groups has been exhausted.

This behavior of the isocyanate in reacting with water can be represented by the following equations:

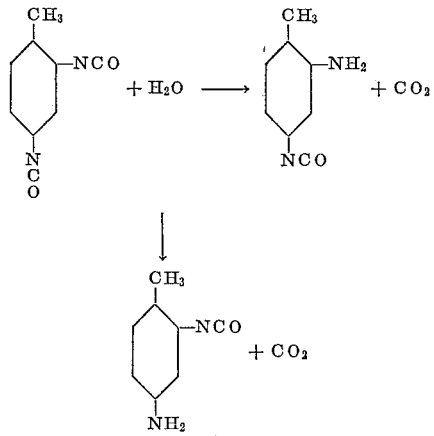

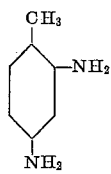

and an additional molecule of carbon dioxide.

The first two amine homologs may, through their residual isocyanate groups, react with additional active hydrogen atoms of the polymeric material and become a part of the polyurethane molecule. The diamine may also react through one of its amine groups with an isocyanate group in a growing polymer chain and thereby become a part of the polymeric molecule.

The existence of the primary aromatic amines in the polyurethane molecule is believed responsible for many of the problems which have been encountered heretofore in producing polyurethane foams having true, stable color values. At the same time, however, there is provided a source of reactive amino groups through which a solution of such problems is enabled.

It is therefore a principal object of our invention to provide a process for improving the color stability of polyurethane foams through neutralization of residual primary aromatic amines therein.

Another object of our invention is to provide a process for the autogenous colorization of polyurethane foams in which primary aromatic amine residues thereof are utilized.

Another object of the present invention is to provide a method for the production of color in a polyurethane foam through the introduction therein of azo-chromophores.

Still another object of the invention is to provide a process of producing colored polyurethane foams in which the chromophore groups are linked directly to the polyurethane molecule.

Other objects and advantages of the invention will be apparent from the following detailed description of certain preferred embodiments thereof.

Briefly stated, the present invention contemplates the production of stabilized color values in a polyurethane foam through chemical reaction involving the primary aromatic amine residues present in the polyurethane molecule.

It is of course well known that primary aromatic amines can be diazotized by nitrous acid and the resultant diazonium compound can be coupled with a suitable aromatic derivative to produce an azo dyestuff. For example,

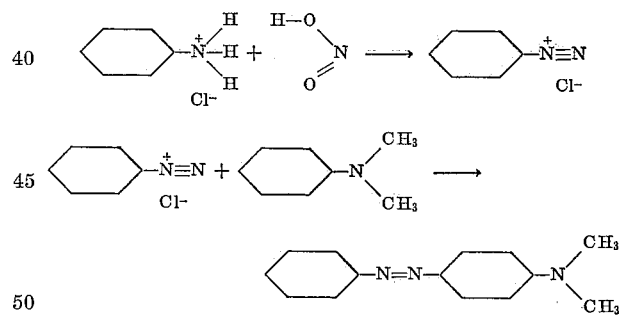

In a similar fashion, the primary aromatic amine contained in the polyurethane molecule undergoes diazotization and the resulting diazonium salt may be coupled directly with a suitable aromatic derivative to produce a dyestuff having an azo chromophore which is linked directly to the polymer chain. Proper selction of the aromatic derivative will determine the color of the final foam.

The invention is illustrated only and not necessarily limited by the following examples:

EXAMPLE 1

This example describes preparation of a polymeric polyester polyurethane.

*Component A*

Into a closed container equipped with an agitator and means for maintaining a nitrogen gas sweep are charged, at room temperature, 50 parts, by weight, of an approximately 80:20 isomeric mixture of toluene-2,4-diisocyanate and toluene-2,6-diisocyanate ("Hylene TM" sold by E. I.

du Pont de Nemours & Company, Inc., Wilmington, Delaware), and 50 parts, by weight, of a polyester resin (alkyd) ("Paraplex U-148 sold by Rohm" Haas Company, Philadelphia, Pennsylvania), having the following properties:

Number average molecular weight ___ 1800–2000.
Equivalent weight _____ 745–830.
Hydroxyl number _____ 65–75.
Acid number _____ 3 maximum.
Water content _____ 0.25% maximum.
Average hydroxyls per molecule ____ 2.42.

The above-described mixture is agitated under a maintained nitrogen atmosphere for four hours, the temperature rising to approximately 32° C.

*Component B*

There are blended at room temperature: 80 parts, by weight, of the polyester resin referred to above, 0.6 part, by weight, of a polyoxyethylated vegetable oil dispersing agent ("Emulphor EL-719" sold by General Aniline and Film Corporation, New York City, New York), 4.5 parts, by weight, of water and 1.9 parts, by weight, of diethylethanolamine.

One hundred parts, by weight, of component A are added to 87 parts, by weight, of component B, and thoroughly mixed for about 20 seconds at a starting temperature of about 25° C. The mixture is then immediately poured into a container of sufficient volume to permit expansion. After about 15 minutes the product sets to a cellular mass, the temperature rising to about 75° C. The container together with the foamed cellular mass is placed in an oven and held at 70° C. for approximately 16 hours. The product, in the form of an open-cell, foamed mass and having carboxylic ester linkages, is removed from the container and cut into blocks.

The blocks have a density of 0.046 gram per cubic centimeter. The proportion of closed cells in the product is very small, and the cell faces have an approximate diameter of 0.3 mm.

EXAMPLE 2

The foam produced in Example 1 is normally white but it gradually discolors and exhibits a yellowish hue, changing to a dark brown after lengthy exposures to actinic rays. This color change occurs within 24 hours under a sun lamp while only 5 hours exposure to the Fadeometer in accelerated tests yields similar results.

EXAMPLE 3

A block of the foam produced in Example 1 was immersed in a 10% solution of acetic anhydride in benzene for 10 minutes. The acetylated product was thoroughly rinsed in clear water and then dried. This treated foam retained its original color for more than twice the length of time of the unacetylated foam of Example 2.

EXAMPLE 4

A block of the foam produced in Example 1 was reacted with a 25% solution of benzoyl chloride in benzene and the treated foam again exhibited superior resistant to fading or discoloration.

The primary aromatic amines provide a convenient source for the autogenous development of azo-chromophores within the polyurethane nucleus.

EXAMPLE 5

A block of the foam produced in Example 1 was immersed in a bath containing 0.6 gram $NaNO_2$ and 1 gram $H_2SO_4$ in 200 cc. of $H_2O$ at a temperature of 140° F. for 30 seconds. The diazotized material, of a pronounced yellow color, was rinsed in clear water and immersed in a bath consisting of 1 gram NaOH, 1 gram naphthanil A.S. and 200 cc. of $H_2O$ at a temperature of 140° F. The foam immediately turned red. After removal of the excess naphthanil A.S., by thorough washing, the foam was subjected to wash test No. 2 of the American Association of Textile Colorist & Chemist and exhibited no loss of color as a result thereof. On exposure to the S-1 ultraviolet sunlamp (ASTM D620–57T) for 48 hours, there was similarly no apparent fading or color change.

EXAMPLE 6

Polyurethane foam diazotized as in Example 5 and of a yellow color was coupled with N,N-dimethyl aniline to produce a foam having an intensely yellow coloration, meeting both the wash test No. 2 and accelerated exposure tests without loss of color.

EXAMPLE 7

This example describes preparation of a polymeric polyalkylene ether polyurethane cellular structure.

*Component A*

To a closed agitated vessel equipped with a nitrogen gas sweep are charged at 40° C., 100 parts, by weight, of a molten polyalkylene ether having a hydroxyl number of 37.6; water content of 0.04%, and melting point about 35° C.; identified as "Teracol 30," which is believed to be a poly-1,4-butylene ether glycol (sold by E. I. du Pont de Nemours & Company, Inc., Wilmington, Delaware). Next, 12.6 parts, by weight, of the toluene-2,4- and 2,6-diisocyanate mixture employed in Example 1, at a temperature of 35° C., are added and agitation is commenced. There is a mildly exothermic reaction, the temperature rising to 45–50° C. Heat is then applied and the mixture is maintained at 60° C. for 2½ hours. Then an additional 12.6 parts of the diisocyanate are added and the temperature is raised and maintained at 140° C. for 2½ hours. The charge is then cooled to 50° C. and a further 3.7 parts, by weight, of the diisocyanate are added and mixed in. Finally, the product is allowed to cool to room temperature, 25° C.

*Component B*

A blend, at 30° C., is prepared of 51 parts, by weight, of dioctyl sebacate, a plasticizer-softener; 10 parts, by weight, of N-methylmorpholine and 2.5 parts, by weight, of triethylamine, catalysts; 5.0 parts, by weight, of a conventional silicone foam stabilizer (Dow Corning DC–200 (50 cstks.)); and 22.5 parts, by weight, of water.

To component B are added 1000 parts, by weight, of component A, and the mixture is stirred rapidly for about 20 seconds. Immediately thereafter the mass is poured into a container of sufficient volume to permit expansion; after about 30 minutes the container together with the foamed mass is placed in an oven and maintained at 70° C. for 16 hours. The product, in the form of an open-celled cellular structure, is removed from the container and cut into blocks. Density of the blocks is about 0.036 gm./cc.; pore size is about 0.5 mm. diameter. Again the foam is white and discolors upon exposure to light.

EXAMPLE 8

A block of the foam as produced in Example 7 was treated with a 20% solution of ethylene oxide in benzene for 12 hours and subsequently washed in acetone and dried. The color of the foam was unchanged by this treatment and the final product exhibited a greatly improved resistance to color deterioration, either fading or darkening, upon exposure to actinic light.

EXAMPLE 9

A block of foam as produced in Example 7 was diazotized as in Example 5 and thereafter coupled with beta-naphthylamine. The final product was of a uniform light orange.

When coupled with alpha naphthol, a foam having a rust color was produced whereas beta naphthol produced in the foam a strong reddish orange hue. In both instances the colored foam showed little tendency to fade or discolor on accelerated exposure tests.

The physical and chemical properties of the polyurethane foams subject to coloration by our process may be varied, as is well known, by controlled modification of the resin formulations and reaction conditions under which the cellulated polyurethane is formed.

The organic polyisocyanates which are useful in the formation of polymeric polyurethane resin foams include among others: toluene 2,4-diisocyanate, toluene 2,6-diisocyanate, m-phenylene diisocyanate, naphthalene-1,5-diisocyanate, 1,5-tetrahydronaphthalene diisocyanate.

The polyesters containing hydroxyl groups adapting them for making foams are prepared by the condensation reaction between a polyol such as a glycol, a polyalkylene glycol, or a dihydric alcohol, and a dicarboxylic acid such as adipic, phthalic, sebacic, succinic or oxalic acid. The polyesteramides are prepared from one or more glycols, one or more dicarboxylic acids, and one or more bifunctional amino bearing compounds such as amino alcohols and diamines. The polyalkylene ether glycols are hydroxy-terminated polyethers derived from alkylene oxides or glycols of the type set forth more fully in U.S. Patents Nos. 2,692,873 and 2,702,797.

Catalysts and emulsifiers are generally employed in the preparation of low density flexible foams. Typical of these materials are the basic tertiary amine catalysts, such as N,N-diethylethanolamine, N-methyl morpholine and N-ethyl morpholine while the emulsifiers are preferably of the nonionic type including sorbitan monolaurate and polyoxyalkylene derivatives or sorbitan monolaurate.

The foam formulations may, as conventional, contain other constituents such as fillers, plasticizers and the like. The actual mixing of the several components of the polyurethane resin, the foaming of the reaction mixture, together with the cure of the product may be carried out at room temperature although curing of the polyurethane foam will be accelerated, by the use of elevated temperatures. In preparing the cellular polyurethanes, the procedures may be carried out either batch-wise or continuously.

It will be obvious to the skilled technician that the neutralization of the residual primary aromatic amines in the polyurethane molecule may be effected by chemical attachment to the amino groups of such amines involving conventional reactions. It will also be obvious that instead of diazotization of these amino groups, suitable diazonium compounds, as for example, benzene diazonium chloride, O-nitro benzene diazonium chloride and alpha naphthalene diazonium hydrogen sulfate may be coupled therewith to create azo and diazoamino chromophores which will impart color to the foam.

The colored polyurethane foams of our invention may be employed in the manner of conventional foams in the manufacture of cushions, upholstery, rug underlay, and may also be laminated to textile materials of various sorts for clothing interliners. The colored foams will withstand the application of adhesives or superficial thermal decomposition incident to the lamination operation without undergoing objectionable discoloration. In this connection, it should also be pointed out that the polyurethane foams may be united to certain fabric substrates such as cotton, if desired, prior to being subjected to the dyeing operations without imparting color to the fabric substrate.

As many widely different embodiments of this invention may be made without departing from the spirit and scope thereof, it is to be understood that this invention is to be limited only as defined in the appended claims.

What we claim is:

1. The process of producing a polyurethane resin foam possessing stabilized color values which comprises neutralizing the primary aromatic amine residues within the polyurethane molecule, after the foam structure has been formed, by a chemical combination with the amino groups of such residues.

2. The process of producing a polyurethane resin foam possessing stabilized color values which comprises introducing azo-chromophores into the polyurethane molecule after the foam has been fully formed and cured.

3. The process of producing a polyurethane resin foam possessing stabilized color values which comprises introducing azo chromophores into the fully formed polyurethane structure by diazotizing the amino groups present in the primary aromatic amine residues within said structure.

4. The process of producing stabilized color values in a fully formed polyurethane resin foam containing primary aromatic amine residues which comprises diazotizing the amino groups present in said residues and thereafter coupling such diazo intermediate with the aromatic component of an azo dyestuff.

5. The process of producing stabilized color values in a fully formed polyurethane resin foam containing primary aromatic amine residues which comprises coupling the amino groups present in said residues with an aromatic diazonium derivative to introduce azo chromophores into the polyurethane molecule.

6. The process of producing stabilized color values in a fully formed polyurethane resin foam containing primary aromatic amine residues which comprises coupling the amino groups present in said residues with an aromatic diazonium derivative to introduce diazoamino chromophores into the polyurethane molecule.

7. The process of claim 2 in which the polyurethane foam is produced from a reaction mixture comprising water, an organic polyisocyanate, and an active-hydrogen containing polymeric material selected from the group consisting of polyesters formed by the condensation of at least one glycol with a polycarboxylic acid, polyester amides and polyalkaline ether glycols.

8. A polyurethane resin foam possessing stabilized color values produced by the process of claim 2.

9. The process of producing a polyurethane resin foam structure possessing stabilized color values, which involves the aftertreatment of said foam structure, comprising the steps of:

contacting the unreacted aromatic primary amine moieties, which are present in said foam due to an incomplete reaction of diisocyanates, with a diazotizing agent capable of diazotizing the primary amine moiety in the fully formed urethane foam;

reacting said diazotized moieties with a coupling compound capable of producing azo dyestuffs fully incorporated into the foam structure; and washing the foam structure to reduce the residuary contaminants present due to the diazotizing and coupling step.

10. A polyurethane resin foam possessing stabilized color values produced by the process of claim 9.

11. The process of producing a polyurethane resin foam structure possessing stabilized color values, which involves the aftertreatment of said foam structure, comprising the steps of:

contacting unreacted aromatic primary amine moieties, which are present due to an incomplete reaction of diisocyanates, with an aromatic diazonium derivative capable of reacting with said primary amine moiety; and thereafter washing said foam structure to remove contaminants.

12. A method for simultaneously reducing the discoloration of polyurethane resin foam structure and dyeing the polyurethane resin foam structure, which involves the aftertreatment of said foam structure, comprising the steps of:

contacting unreacted aromatic primary amine moieties, which are present in said foam structure due to an incomplete reaction of diisocyanates, with a diazotizing agent capable of diazotizing the primary amine moiety in the fully foamed urethane foam;

reacting said diazotized moieties with a coupling compound capable of producing azo dyestuffs fully incorporated into the foam structure; and washing the foam structure to reduce the residuary contaminants present due to the diazotizing and coupling step.

13. A method for simultaneously reducing the discoloration of polyurethane resin foam structure, dyeing the polyurethane resin foam structure and inhibiting the decomposition of said foam structure, which method involves the aftertreatment of said foam structure comprising the steps of:

contacting unreacted aromatic primary amine moieties, which are present due to an incomplete reaction of diisocyanates, with an aromatic diazonium derivative capable of reacting with said primary amine moiety;

and thereafter washing said foam structure to remove the unreacted aromatic diazonium derivative.

14. A method for simultaneously reducing the discoloration of polyurethane resin foam structure and dyeing the polyurethane resin foam structure, comprising the steps of:

contacting the unreacted aromatic primary amine moieties, which are present due to an incomplete reaction of diisocyanates, with a diazotizing agent capable of diazotizing the primary amine moiety in the fully foamed urethane structure;

reacting said diazotized moieties with an aromatic component of an azo dyestuff; and washing the foam structure to remove the impurities present.

15. A method for simultaneously reducing the discoloration of polyurethane resin foam structure and dyeing the polyurethane resin foam structure, comprising the steps of:

contacting the unreacted aromatic primary amine moieties, which are present due to an incomplete reaction of diisocyanates, with a diazotizing agent capable of diazotizing the primary amine moiety in the fully foamed urethane structure;

reacting said diazotized moieties with an aromatic part of an organic dyestuff capable of coupling with the diazotized diazonium salt;

treating the foam structure to remove the impurities present.

16. The process according to claim 1 wherein an aliphatic acid is combined with the fully formed foam.

17. The process according to claim 1 wherein acid anhydrides are combined with the fully formed foam.

18. The process according to claim 1 wherein aromatic acid anhydrides are combined with the fully formed foam.

19. The process of claim 1 wherein organic acid chlorides are combined with the fully formed foam.

References Cited by the Examiner

UNITED STATES PATENTS

| | | |
|---|---|---|
| 1,500,844 | 7/24 | Plauson. |
| 2,986,536 | 5/61 | Anderson. |

FOREIGN PATENTS

| | | |
|---|---|---|
| 897,991 | 7/47 | Germany. |

OTHER REFERENCES

Chemical Abstracts, 1958, page 11466.

Childers: WADC Technical Report 57–682, January 1958, ASTIA Document No. AD 142–282, The Development of Non-Adhering Chemically Foamed-in-Place Polyurethane Cushioning Material for Packaging Purposes, pages 3–18.

Paint Manufacturer, January 1953, pages 20–22 and 29.

NORMAN G. TORCHIN, *Primary Examiner.*